Oct. 14, 1952 W. G. TOLAND 2,613,584
HYDRAULIC RAM ATTACHMENT FOR IMPLEMENTS
Filed Dec. 26, 1947 2 SHEETS—SHEET 2
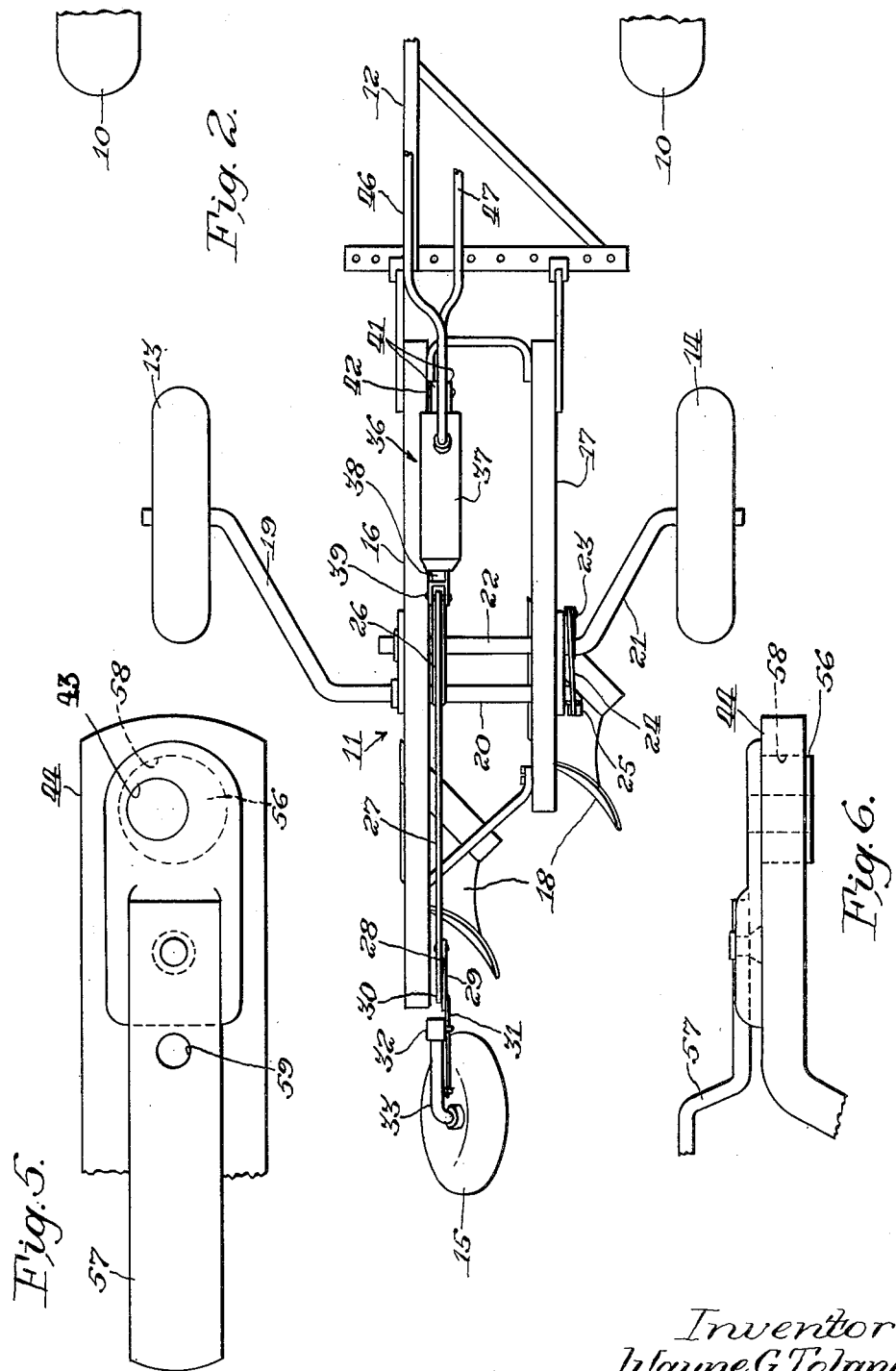
Inventor
Wayne G. Toland
Paul O. Pippel
Atty.

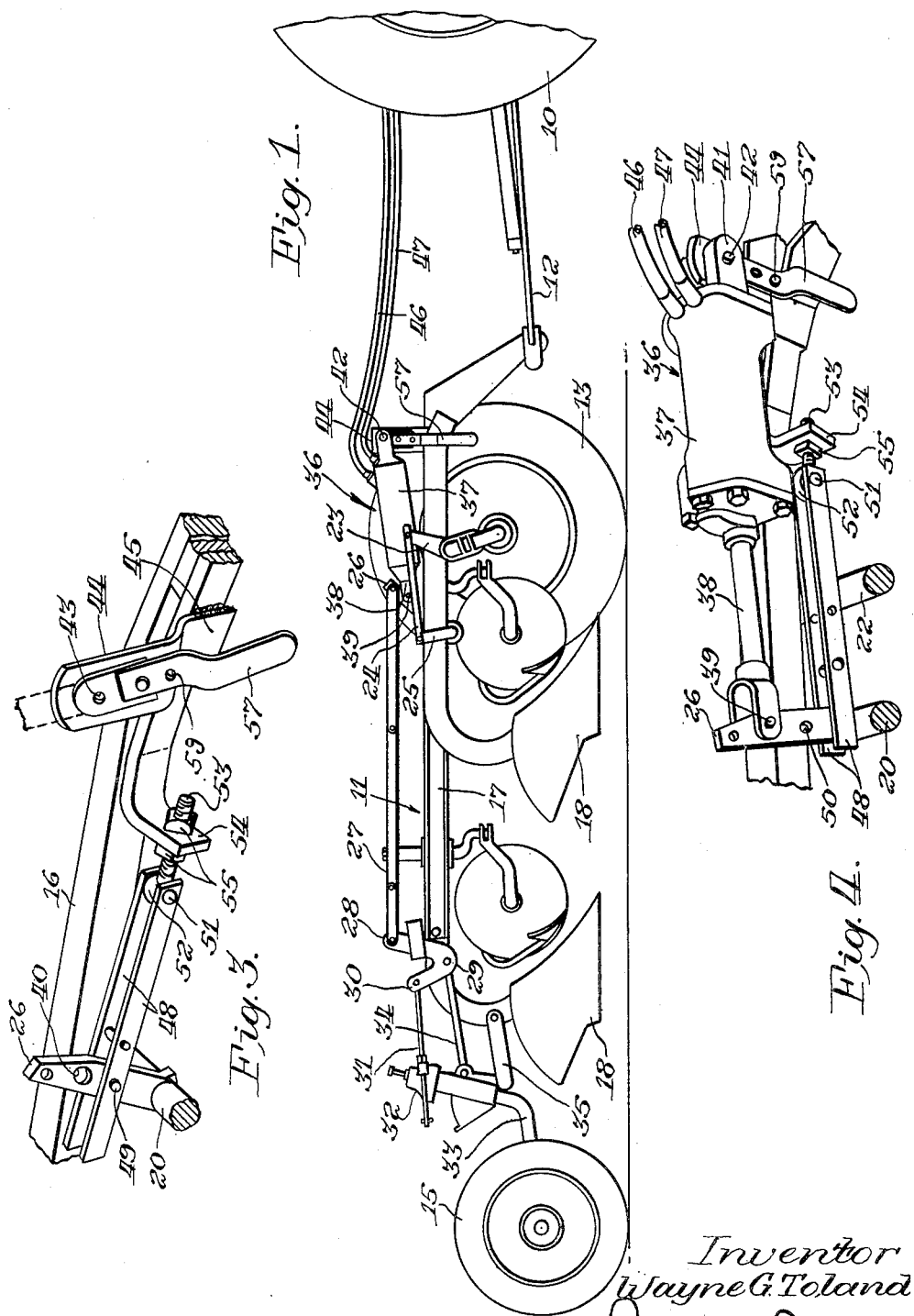

Patented Oct. 14, 1952

2,613,584

UNITED STATES PATENT OFFICE 2,613,584

HYDRAULIC RAM ATTACHMENT FOR IMPLEMENTS

Wayne G. Toland, Canton, Ill., assignor to International Harvester Company, a corporation of New Jersey Application December 26, 1947, Serial No. 794,007

1 Claim. (Cl. 97—50)

This invention relates to agricultural implements and particularly to power-lift mechanism for moving the implement between operating and transport positions. More specifically, the invention relates to lifting mechanism deriving power from a tractive vehicle and adapted for mounting upon different types of implements.

The invention is particularly concerned with power operated rams and supporting mechanism by which they are mounted upon an implement for moving the working tools between operating and transport position and the like. The structure of the present invention will be illustrated and described in its application to an agricultural implement of the trail-behind type adapted for connection in draft receiving relation to a tractive vehicle having a power plant thereon and a source of fluid pressure by which fluid under pressure may be supplied to the ram unit for operating it.

When a ram unit is supplied by power from a tractor and placed upon a trail-behind implement, communication is made with the source of power on the tractor by means of flexible hose, and when the implement is disconnected from the tractor the ram unit generally is retained thereupon. The ram unit with which the present invention is concerned is of the hydraulic double-acting type under control of the tractor operator and in which the fluid holds the piston in the position in the cylinder it occupies when it is dismantled from the implement. In farm operations it is customary for the operator to utilize this same hydraulic cylinder and piston unit for any implement which he may attach to the tractor. However, manufacturing variations are a common occurrence in implements and in the attaching elements by which the cylinder is carried upon the implement. Therefore when the ram unit is taken from one implement and mounted upon another or returned to the original implement, the connecting points at the end of the piston and of the cylinder do not coincide with the connecting elements upon the implement. The operator has previously resorted to altering the position of the piston on the cylinder. However, the adjustment of the piston in the cylinder to conform to the spacing between the connecting elements on the implement supporting structure has been accomplished by trial and error. That is, it has been necessary for the operator to manipulate the fluid controls upon the tractor to advance and retract the piston until the connecting elements of the cylinder are in proper position with respect to the corresponding elements upon the implement.

An object of the present invention is to provide novel and efficient means for avoiding the foregoing difficulties and to facilitate the mounting of a ram unit upon various implements.

Another object of the invention is to provide means for adjusting the spacing between the connecting elements up the implement to conform to the length of the ram unit, that is, the spacing between the connecting elements upon the piston and the cylinder.

Another object of the invention is to provide in one of the supporting structures upon the implement a rotatable member having a connecting element eccentrically mounted thereupon and means for rotating the element to provide a range of adjustment therefor in order to adjust the spacing between the connecting elements upon the implement to conform to the spacing between the connecting elements of the ram.

These and other objects of the invention will become clear from the following detailed description when read in conjunction with the accompanying drawings wherein:

Fig. 1 is a view in side elevation showing the rear end of the tractor having attached thereto an agricultural implement of the trail-behind type in the form of a moldboard plow and showing the power lift mechanism of the present invention associated therewith;

Fig. 2 is a plan view of the structure shown in Fig. 1;

Fig. 3 is an enlarged detail showing the supporting mechanism by which the ram unit is mounted upon the implement;

Fig. 4 is a detail showing the ram unit mounted upon the implement supporting structure;

Fig. 5 is a detail of a bracket mounted upon an implement to which one end of the ram unit is connected; and Fig. 6 is a side elevation of the structure shown in Fig. 5.

Referring to the drawings, numeral 10 designates the rear drive wheel of a tractor to which is connected in trail-behind relationship an agricultural implement in the form of a moldboard plow comprising a frame 11, a hitch structure 12 for connection of the implement to the tractor, and a land wheel 13, a front furrow wheel 14 and a rear furrow wheel 15 upon which the implement is supported. Frame 11 comprises a pair of laterally spaced longitudinally extending tool-beams 16 and 17 which curve downwardly at their rear ends and have secured thereto plow bottoms 18. Land wheel 13 is mounted upon a crank axle 19 having a transverse portion 20 rotatably mounted in bearings carried on the beams 16 and 17. Furrow wheel 14 is mounted upon a crank axle 21 having a transverse portion 22 similarly mounted in bearings carried upon the beams 16 and 17.

It should be clear at this point that rocking of the crank axles 19 and 21 will vertically move the implement frame 11 carrying the earthworking tools between operating and transport position. In order that the crank axles 19 and 21 may be rocked simultaneously during raising or lowering of the plow frame, connecting mechanism is provided including an arm 23 mounted upon a transverse portion of the crank axle 21 and connected by a link 24 with the upper end of an arm 25 secured to the end of crank axle 19 extending from the beam 17. Rocking of the crank axles 19 and 21 to lift the plow frame is transmitted to the rear furrow wheel 15 through mechanism comprising an arm 26 affixed to and extending upwardly from the transverse portion 20 of the crank axle 19 and having connected to the upper end thereof one end of a rod 27, the other end of which is pivotally connected to an arm 28 of a bell crank 29 pivotally mounted upon the rear portion of beam 16 which is longer than and extends rearwardly of beam 17. Another arm 30 of the bell crank is slidably connected by a rod 31 with a casting 32 at the upper end of a crank axle 33 upon the rear end of which the rear furrow wheel 15 is mounted. The mounting of the crank axle 33 upon the plow frame is conventional and includes upper and lower parallel links 34 and 35 accommodating swinging movement of the crank axle 33 in a longitudinal direction to vertically move the furrow wheel 15 in a direction and to the extent of the movement of wheels 13 and 14.

Rotation of the crank axles 19 and 21 to raise and lower the implement is accomplished by power lift mechanism deriving power from the tractor power plant and including a ram unit 36 which comprises a cylinder 37 and a piston 38. The piston 38 is bifurcated at its end and apertured to receive a pin 39 insertable in an aperture 40 serving as the connecting element of the ram 36 upon the arm 26. The cylinder 37 is provided with a pair of lugs 41 apertured to receive a pin 42 insertable in an opening 43 provided in a bracket 44 extending upwardly and secured at its lower base portion 45 to the beam 16. Bracket 44 thus serves as an anchor against which the ram unit reacts when fluid under pressure is directed to the ram unit 36 to extend or retract piston 38. Fluid under pressure is supplied from a pressure source upon the tractor, not shown, through hose lines 46 and 47. The passage of fluid through the hose lines 46 and 47 to the tractor pressure source, it may be understood, is under control of the tractor operator through conventional valve mechanism, not shown, but preferably including mechanism for stopping the flow of fluid to and from the ram unit 36 so that the piston 38 may be maintained in a selected position with respect to the cylinder 37.

By virtue of the connection of piston 38 to rock arm 26, the crank axles 19 and 21 may be swung vertically to raise and lower the plow frame with respect to the wheels 13, 14 and 15, as previously set forth. It will be noted that extension of the piston 38 in the cylinder 37 will rock the arm 26 in a counterclockwise direction and lower the plow bottoms 18 from the raised position shown in Fig. 1 to an earth working or operating position and that by retraction of the piston 38 within the cylinder the plow bottoms will be raised from the ground.

As stated before, when the implement shown in the drawings is to be disconnected from the tractor, the ram unit 36 which remains with the tractor must likewise be disconnected. Inasmuch as it is desirable that the implement be transportable when the ram is removed therefrom, it is locked in transport position by mechanism including a pair of spaced links 48 apertured to receive a pin 49 insertable in an opening 50 in the rock arm 26. A pin 51 is passed through the other ends of the link 48 and an eyebolt 52 is mounted thereupon. Eye bolt 52 is provided with a threaded shank 53 which extends through an opening in an ear 54 projecting outwardly from the base portion 45 of bracket 44. Nuts 55 are provided at opposite sides of the ear 54 upon the shank 53 for adjusting the effective length of the links 48 by which the rock arm 26 is locked to the frame, the links 48 and the bolt 52 thus serving as a locking or latching mechanism to hold the arm 26 in position and maintain the earth working tools out of the ground for transport purposes.

It has been previously pointed out that the ram unit 36 remains with the tractor when the implement is removed and is utilized in the operation of subsequent implements, such as harrows, disk plows, cultivators and the like, embodying marked structural differences and, due to manufacturing irregularities, lacking uniformity of spacing between the connecting elements by which the ram unit is attached thereto. Assuming that the ram unit has been used upon other implements and is now being replaced upon the moldboard plow, shown in the drawings, the cylinder 37 is attached to bracket 44 by inserting pin 42 through the apertures in lugs 41 and opening 43 in the bracket. The aperture 43 which receives the pin 42 is eccentrically mounted with respect to the axis of a cylindrical rotary member 56 affixed to or integral with a lever 57. Rotary member 56 is mounted in an opening 58 in the upper end of bracket 44. The member 56 may therefore be rotated by manipulation of the lever 57. Due to the eccentric mounting of the opening 43 with respect to the rotary member 56, rotation of the member by moving the lever 57 will move the ram longitudinally. Pin 39 is now inserted in the openings in piston rod 38 and lever 57 is manipulated until these openings aline with opening 40 in rock arm 26. Pin 39 is then driven home. Lever 57 is again manipulated to relieve the tension on pin 49, whereupon it is removed so that arm 26 and the ram are free to operate. Lever 57 is thus pushed down to the position shown in solid lines in Fig. 3, and pin 49 is inserted in an opening 59 provided in the lever and registering with an opening, not shown, in bracket 44.

The invention has been described in its preferred embodiment. However, it should be understood that modifications may be made therein without departing from the spirit of the invention or the scope of the appended claim.

What is claimed is:

In a wheel supported agricultural implement having a tool-carrying frame movable relative to the wheels between operating and transport positions, a member movable to raise and lower the frame, means for moving the movable member to raise and lower the implement comprising a hydraulic ram, separable means for connecting one end of the ram to said movable member and means for connecting the other end to the frame including a bracket mounted on the frame, a rotatable member carried by the bracket, a connecting element formed eccentrically with the rotatable member, a cooperating element carried by the ram and registrable with said connecting element for attachment thereto, and means for rotating said rotatable member to conform to the length of the ram.

WAYNE G. TOLAND.

REFERENCES CITED

The following references are of record in the file of this patent:

UNITED STATES PATENTS

| Number | Name | Date |
|---|---|---|
| 1,144,547 | Johnston | June 29, 1915 |
| 1,165,080 | Elliot | Dec. 21, 1915 |
| 1,174,459 | Winckler | Mar. 7, 1916 |
| 1,991,781 | Bird | Feb. 19, 1935 |
| 2,184,431 | Morkoski | Dec. 26, 1939 |
| 2,320,742 | Newkirk | June 1, 1943 |
| 2,344,123 | Brown et al. | Mar. 14, 1944 |